United States Patent Office 2,878,112
Patented Mar. 17, 1959

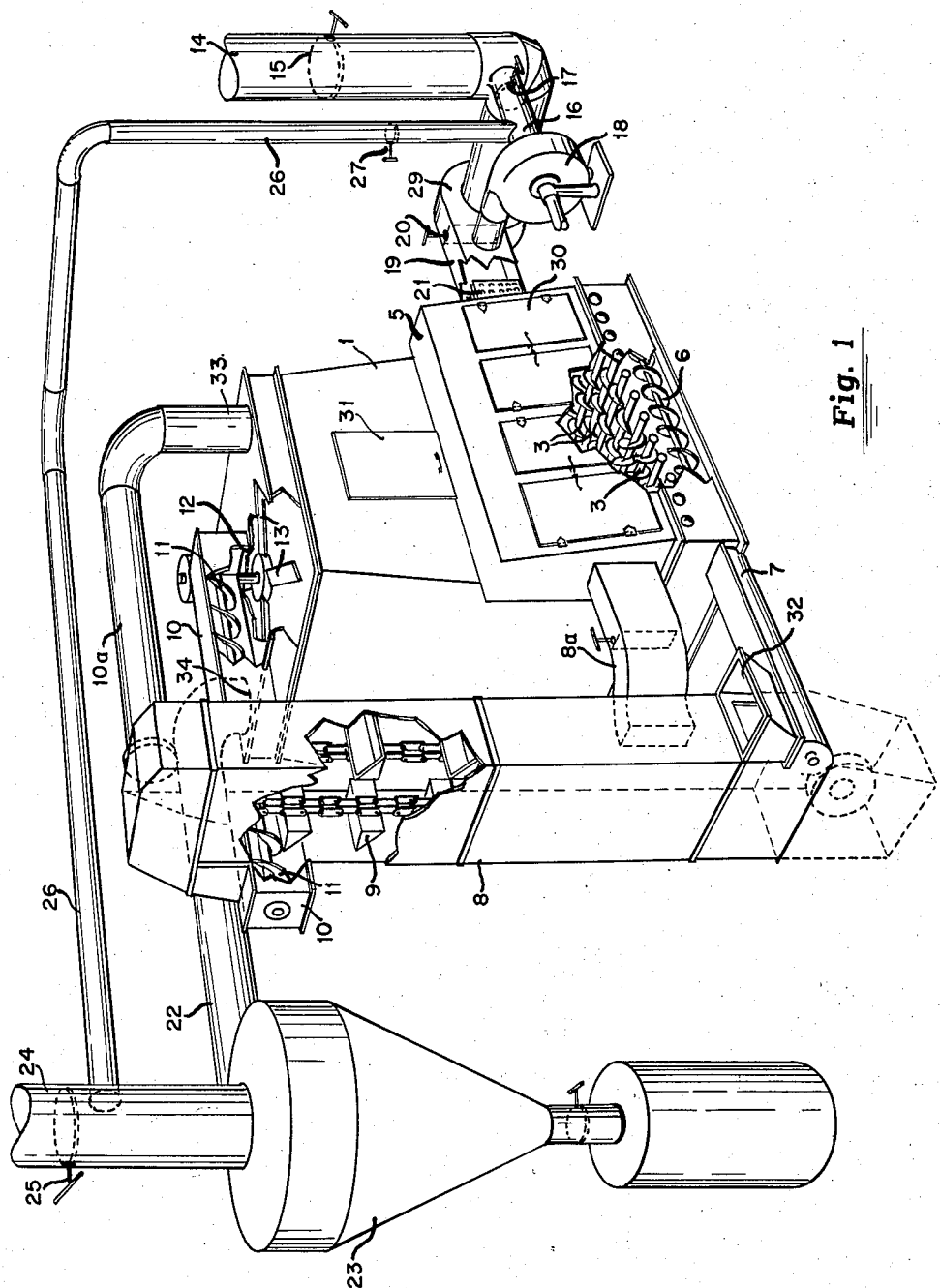

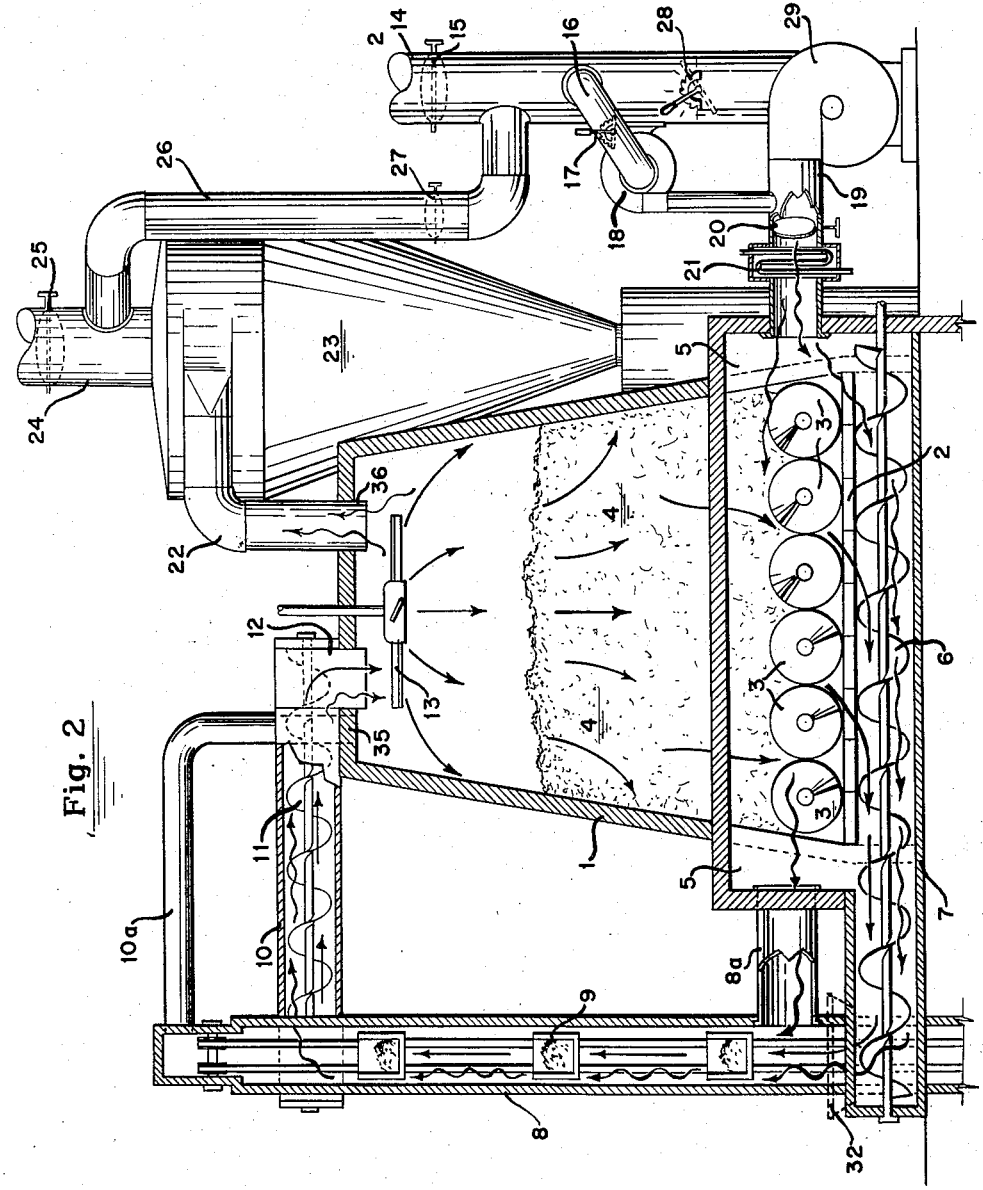

2,878,112

METHOD AND APPARATUS FOR COMPOSTING MANURE

Willard L. Morrison, Lake Forest, Ill., assignor to The Union Stock Yard and Transit Company of Chicago, Chicago, Ill., a corporation of Illinois Application August 17, 1955, Serial No. 529,055

10 Claims. (Cl. 71—9)

My invention relates to an improvement in method and apparatus for the composting of organic manure and the like and has for one object to provide a method and apparatus which will, under controlled conditions, produce generally uniform quantities of composted, dried animal and organic manure which may be shipped, stored and used without unpleasant odors and without deterioration of paper bags and the like in which the manure is shipped.

It is well known that under some conditions organic manure such as packing house manure, stable manure and the like may be composted preferably by setting up in the mass of manure a situation favorable to the growth of aerobic bacteria or microbia. Such microbia under favorable conditions are effective to digest or compost the manure without substantial loss of nutritional values so that the manure can be easily and effectively used as a fertilizing agent.

Another object is an improved apparatus for composting manure in a rapid and efficient manner on a semiautomatic basis.

My invention is illustrated more or less diagrammatically in the accompanying drawings wherein:

Figure 1 is a perspective of my composting apparatus, and Figure 2 is a side section of a slightly modified form.

The basic elements of the two units are generally the same and line up about as follows:

1 indicates generally a composting chamber, the horizontal cross sectional area of which increases downwardly. The chamber is bounded at the bottom by a solid floor 2, as shown in Figure 2. Supported immediately above this floor are a plurality of conveyor screws 3 which are illustrative of any suitable means adapted to move the lower layer of a mass of manure 4 in Figure 2 contained within the chamber laterally along the floor 2 for discharge into a receiving or plenum chamber 5. The screws 3 extend into a receiving chamber 5 and at their discharge ends overlie a transverse screw conveyor 6 so that as the screws 3 move manure laterally across the floor from the bottom of the mass and discharge it to the transverse conveyor 6, the conveyor 6 propels the manure laterally along a trough 7 and discharges it to an elevator 8. The manure is picked up by elevator buckets 9, conveyed upwardly and discharged to a trough 10 along which a screw conveyor 11 conveys it for discharge into a chute or discharge 12 above a distribution and comminuting fan 13.

The manure is thus recirculated as composting continues. The straight arrows in Figure 2 indicate the path of the manure as it travels downwardly through the downwardly expanding chamber, the inclined walls of which furnish no opportunity for bridging, the body of manure being thus supported on the floor and screws, the bottom layer being withdrawn from the mass discharged laterally and by the screw conveyors and the elevator and being returned to the top of the mass through the comminuting fan.

During part of the operation of the composting process it is desirable to aerate the manure to promote microbial action.

14 is an air duct, leading from any suitable source of air, controlled by a suitable damper 15. 16 is a composting air branch leading from the air duct 14, controlled by a suitable damper 17 and supplying air to a composter fan 18. The composter fan discharges air to a suitable duct 19, controlled by a suitable valve or damper 20. The air passes through a heating, moisture and temperature control chamber 21, enters the chamber 5, passes through the chamber, traveling in the same direction as the manure through a bypass duct 8a to the elevator boot 8 thence upwardly with the manure to the trough 10 and enters the top of the chamber 1 through a second bypass duct 10a with the manure. The air then passes out through the duct 22 to a cyclone separator 23 or the like, some of the air being discharged through the duct 24 controlled by the damper 25, some of the air being discharged through the duct 26 controlled by the damper 27 for return to the intake.

Because the microbia which are to do the digesting job thrive best under controlled conditions of air, moisture, and temperature and because they generate heat themselves in their living process and because the raw manure contains moisture, it is important to provide the moisture and temperature control chamber so that air can pass through it on its way to the chamber 5 and may be controlled in coordination with the character of the manure and the progress of composting, in temperature and moisture, so as to maintain the desired conditions in composting.

In Figure 1 the top of the chamber 5 may be provided with a plurality of inspection ports 30 with a suitable entrance port or door 31 on the side of the chamber proper. A suitable feeder or hopper 32 is arranged on the side of the elevator 8 where, during initial loading, the elevator can be operated to take manure, brought in by trolley or truck, to the top of the chamber.

The warm air bypass 10a empties into the top of the chamber at 33 from one corner, and the outlet or exhaust duct 22 is connected at 34 on the opposite corner where the circulating air will be drawn in a more or less arcuate path across the freely falling material as it is pulverized and disintegrated by the mill or fan 13. Thus a maximum amount of aeration will take place and the flow or current of controlled air between the inlet 33 and the outlet 34 will also aid in distributing the material across the top surface of the pile.

The same general relationship is shown in Figure 2 in which bypass 10a opens into the top of the chamber generally at 35 and the exhaust 22 communicates with the top of the chamber 36 on the side opposite from the inlet directly across the fan 13, and the same result can be acquired.

The disposition of parts between Figures 1 and 2 is basically the same. Although the arrangement and positioning is different, it should be understood that either unit can be used to carry out the same basic method and can be made to operate in the same general manner.

While I have not indicated any particular driving means for the various conveyors, elevators, fans, blowers and the like, it should be understood that any suitable means and suitable controlling mechanism for them can be used.

Since the composting air is circulated with the manure along the path of the crooked arrows in Figure 2, the manure, as it is withdrawn from the bottom of the mass and broken up by the conveyors and by the fan, is constantly exposed to the flowing current of controlled air. Thus, each particle of the manure, as it travels from the bottom back to the top of the composting mass, is able to pick up and bring back to the mass an amount of air and moisture at the desired temperature to permit continued microbial action as the manure travels downwardly through the mass. It is not necessary to force air through the composting manure mass, and experience has taught that this is undesirable because whenever air is forced through a thickness of manure, channeling is likely to take place, the result being that some of the manure gets too much of the air and moisture; other gets not enough. But when every part of the manure, as it is recirculated is exposed to the air on the conveyors and especially with the hammer mill type fan blades, sufficient air and moisture at proper temperatures reaches the individual particles to promote satisfactory microbial digestion.

The use, operation and function of my invention are as follows:

To make saleable compost, or fertilizer from raw manure within the shortest period of time, it is necessary to control a number of factors. Possibly the most important factors are the temperature of the manure, the moisture content of the material, and the rate of air circulation. I have found that composting will take place at a rapid rate if the moisture content of the material is approximately between 55 and 65%, its temperature between approximately 125 and 140° F. with approximately 131 degrees as the optimum, and the air volume is at a rate of approximately 60 cubic feet circulated per hour for every cubic foot of material recirculated or recycled per hour, although, of course, these factors can be varied somewhat.

The units in Figures 1 and 2 can be operated by first filling the chimney or stack by using the elevator and top cross screw 11 without operating the lower screws 3 and 6. As soon as the chimney has been filled, the material should be brought to the optimum or ideal condition as rapidly as possible so that composting can start. I term this a preconditioning period and it should be understood that such a period is not always necessary. For example, in the winter time the collected material to be composted may be very wet and may have a moisture content in excess of the 55 to 65% optimum range. In this case the preconditioning period should be used to dry the material down to approximately 55 to 68% moisture range, and this could be done by operating the heater and the low velocity, high capacity fan 29 at its maximum capacity to heat the inlet air and at the same time to circulate the material through the elevator system and the closed circuit. This simultaneously dries the material and reduces its moisture content and raises its temperature from ambient up to the optimum temperature range of 125 or 140° F.

The preconditioning period then may be followed by the main or compost period, during which the conditions in the unit are held as constant as possible at the optimum, and the circulative air is controlled at the temperature, quantity or rate, a proportioning of recirculative and fresh air, and moisture content. During the compost period the high volume fan is not used, and the smaller fan 18 forces air through the conveyor and the bypasses across the breaker fan on top of the chamber to the outlet. The amount of recirculated air is controlled by the dampers 15, 27 and 17, and the amount of air circulated through the material should be held approximately constant during the compost period. The proportion of fresh air and recirculated air in the controlled air current can be varied in accordance with the pH of the material. As soon as the temperature is within the desired range, fresh air can be brought into the recirculated air in accordance with the pH of the material, but before this point, fresh air should be cut out at the damper 15 and only recirculated air used so that the temperature of the material will rise as fast as possible. During the normal composting period, if the pH of the material is low, more fresh air is added, but if the pH is high, the fresh air is reduced and the recirculated air increased.

As soon as the material is fully composted, the material should be dried and this is termed a drying period. The high volume fan is used exclusively during this period and the compost fan 18 is cut out. The heater, of course, is operated full blast to supply as much heat to the air current as possible. It should be remembered that the moisture content of the material, at the start of the drying period, is between 55 and 68%. I have found that it is desirable to reduce the moisture content of the material to approximately 25 or 30%, although it can be reduced to a lower figure, if desired. During this period, the bypasses 8a and 10a remain open so that the material is dried as fast as possible.

During any of these periods, the temperature of the material and the temperature of the air can be determined by any conventional thermometers or the like disposed at any appropriate places. The moisture content of the material can be determined by a simple weight method, although experienced operators can learn to judge this factor accurately by touch or feel. The air circulation, of course, is merely a question of proper regulation of the fans, ducts, bypasses, flues, and elevators.

Any suitable discharge mechanism can be used to remove the material from the compost chamber after it is fully composted and dried.

I have also found that it is very desirable to control the quantity of compost air that is circulated in direct relation to the rate of circulation of the material.

For example, the elevator and conveyors can be used to transfer the material from the bottom to the top of the pile at a rate, say, of 1500 cubic feet per hour. For this, the small fan should be arranged to circulate air through the unit at a rate of approximately 1500 cubic feet per minute. As the compost period continues the material will be digested and the initial total tonnage of material decreases steadily in volume and weight until at the end of the compost period, I have found that it will be decreased approximately 25 to 30%.

One of the important features of the invention is the aeration performed by the breaker fan 13 on top of the chamber. The material falls freely from the conveyor 11 through the opening 12 to the top of the pile, and is directed across the rotating blades of the fan. These blades propel the material in all directions and at the same time the outlet and inlet straddle the falling path so that the air current flows generally at right angles to it. The air current, additionally, will serve to further break up the material at the same time that it aerates it.

The method that can be carried out has the folowing features:

The manure mass, as composting takes place, is caused to settle gradually downward with lateral movement accompanying downward movement as composting takes place.

The bottom layer of the manure in the composting zone is withdrawn laterally therefrom, elevated to a point above the upper layer of manure in the zone, and returned by gravity, in a freely falling condition, from such elevated point to the top layer of the zone.

The manure, at it travels from the bottom to the top of the zone, travels through a continuous flowing controlled air stream so that, as the manure is subjected to the conveying effect of a sequence of conveying steps, it is constantly exposed to the air.

As the manure falls freely toward the upper layer of manure in the composting zone, it is disintegrated and distributed in the presence of the air stream and generally at right angles to it for distribution across the top of the mass in an air chamber above but bounded at its bottom by the composting zone.

The air is withdrawn from the chamber for recirculation with the manure.

This recirculated air is cleaned in a cyclone separator, and the solids and liquids, if any, removed from it are returned to the manure circulating system. Some of the air is discharged from the system and replaced by fresh air and some of the air is recirculated.

When composting is complete, dry hot air is circulated with the manure during a drying period, and the manure is recirculated until it is dried. Under these circumstances little, if any, of the air is recirculated. The air is permitted to leave the system carrying with it the moisture which has dried from the manure.

During composting the temperature of the air is heated or cooled as the case may be, to maintain proper temperature conditions in the composting mass, and the air is supplied with moisture in controlled quantities sufficient to maintain proper moisture conditions for composting.

In the preconditioning period in the composting zone, manure may be too wet in which case warm dry air will be circulated until proper moisture temperature conditions prevail. Thereafter moisture, rate and temperature control of the air will continue during composting to be followed by drying of the circulating manure by warm dry air circulating with it.

There is no need for any forcing of air upwardly through the composting manure mass. The aeration of the manure particles and their disintegration as they are being aerated both in the conveyors carrying the manure from the bottom and returning it to the top of the zone and in the disintegrating fan which distributes and finally disintegrates the manure as it is spread over the upper surface of the mass provide sufficient air and moisture so that adequate digestion takes place during the downward movement of each manure particle from the top to the bottom of the composting mass.

This is a continuation-in-part of my copending application Serial No. 513,108, filed June 3, 1955.

While I have shown and described the preferred form and one modification of my invention, it should be understood that many changes may be made in size, shape, number and disposition of parts without departing from the spirit of my invention. I, therefore, wish my description and drawings to be taken as in a broad sense illustrative or diagrammatic, other than in limiting me to my specific showing herein.

I claim:

1. A method of composting organic manure and the like, which consists in establishing and maintaining a vertically disposed column of manure, progressively withdrawing some of the manure from the bottom of the column and subsequently returning it to the top of the same column of manure on a continuous basis, whereby each manure particle in the column migrates slowly from the top to the bottom of the column and then is returned to the top more quickly, disintegrating the withdrawn manure between the bottom of the column and its return to the top of the column, and continuously aerating such manure by exposing it to a controlled current of moist warm air as it travels from the bottom back to the top of the column only.

2. The method of claim 1 characterized by and including the step of allowing the manure to fall freely a short distance by gravity as it is returned to the top of the column, and disintegrating the manure while it is falling.

3. The method of claim 2 characterized by and including the step of directing a current of air generally at right angles to and laterally across the freely falling manure as it is disintegrated.

4. A method of composting organic manure and the like, which consists in maintaining a vertically disposed mass of manure generally at rest, continuously withdrawing some of the manure from the bottom of the column for subsequent return to the top of the same column, and disintegrating the manure and aerating it only during its travel between the bottom and the top of the column, by exposing it to a current of moist warm controlled air during at least a substantial portion of its travel between the bottom and top whereby each particle migrates slowly without agitation or disintegration downward from top to bottom as the aerobic microbia in the manure perform their composting work.

5. A method of composting organic manure which consists in assembling the manure in a vertical column, withdrawing some of the manure from the bottom of the column, at the same time allowing the material in the column to settle gradually, conveying the withdrawn manure from the bottom to the top of the column, exposing the manure only during a major portion of its movement from bottom to top to warm moist controlled air, and disintegrating the manure in the presence of such air, during its movement from bottom to top, whereby the separate manure particles are exposed to, aerated by and provided with moisture from such air.

6. A method of composting and preparing organic manure for storage and shipment, which consists in enclosing a mass of the manure in a composting zone, continuously withdrawing some of the manure from the bottom of the zone, disintegrating, and returning it to the top of the mass for recirculation through the zone, as composting continues, subjecting the withdrawn manure only as it travels from the bottom to the top of the mass to a controlled air current, the temperature and moisture content of which are controlled in consonance with the temperature and moisture content necessary to promote aerobic microbial action, and, when composting is complete, subjecting the withdrawn manure, before it is returned to the top of the mass, to a current of warm dry air at a greater rate until the entire mass is dried for storage and shipment.

7. Means for composting organic waste including a vertically disposed chimney adapted to be filled with a column of composting material, means for withdrawing material from the bottom of the comlun and returning it to the top of the same column in a closed circuit, means for disintegrating the material as it is returned to the top, and a closed combined air and manure circulating duct as a part of said closed circuit for aerating the manure only during its moveemnt from the bottom of the column back to the top of the same column.

8. The structure of claim 7 further characterized by and including means for controlling the temperature and moisture content of the air in that part of its path from the top of the chamber to the point at which it meets the manure as it is withdrawn from the chamber.

9. Means for composting organic manure which include a vertically disposed composting chamber, a floor for the chamber, the walls of the chamber above the floor being inwardly inclined to prevent bridging of the contents thereof and to insure that the entire weight of a manure mass in the chamber is supported on the floor, conveyor means immediately above the floor for propelling the lowermost layer of manure laterally along the floor and discharging it from the composting chamber, a combined closed air and manure circulating duct extending from the bottom of the composting chamber for communication with the top of the same composting chamber, manure conveying means therein adapted to receive manure discharged by the conveying means in the composting chamber and conduct it upwardly for return to the same composting chamber at a point above the manure mass supported therein on the floor, means for supplying air under pressure to the combined circulating duct for aerating the manure only in the combined circulating duct and for discharge into the composting chamber above the normal level of the manure mass therein, means in the path of the manure within the composting chamber for disintegrating it as it freely falls downwardly toward the manure mass, and means for withdrawing air from the upper portion of the composting chamber for recirculation with the manure.

10. The structure of claim 9 in which the point of discharge of the air into the top of the chamber and the point of withdrawal of air therefrom generally straddle the disintegrating means.

References Cited in the file of this patent

UNITED STATES PATENTS

| | | |
|---|---|---|
| 2,014,764 | Gram | Sept. 17, 1935 |
| 2,178,818 | Earp-Thomas | Nov. 7, 1939 |
| 2,209,613 | Roeder | July 13, 1940 |
| 2,660,809 | Morrison | Dec. 1, 1953 |